Feb. 7, 1950

W. C. JENKINS 2,496,727

AUTOMATIC ELECTRIC TRACTOR GUIDE

Filed Feb. 11, 1949

INVENTOR.
WILLIAM C. JENKINS,
BY
McMorrow, Berman & Davidson
ATTORNEYS.

Feb. 7, 1950 — W. C. JENKINS — 2,496,727
AUTOMATIC ELECTRIC TRACTOR GUIDE
Filed Feb. 11, 1949 — 4 Sheets-Sheet 2
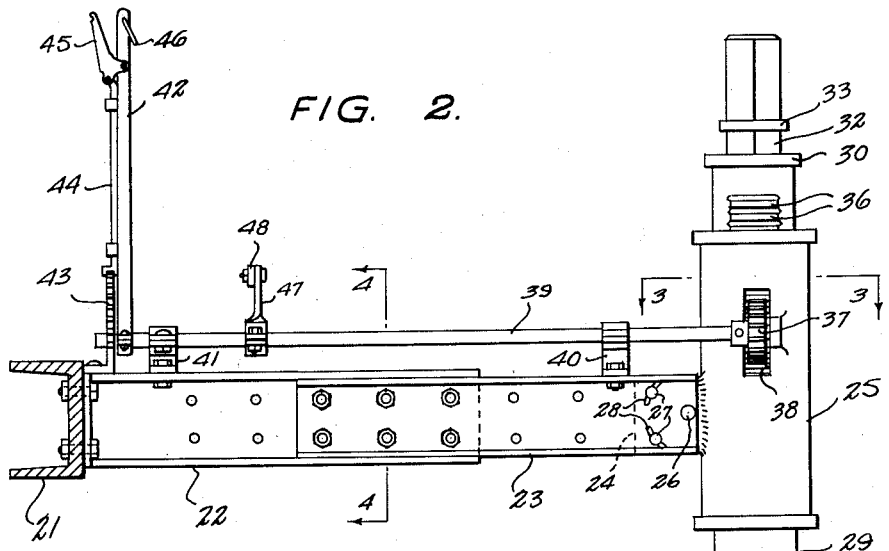
FIG. 2.
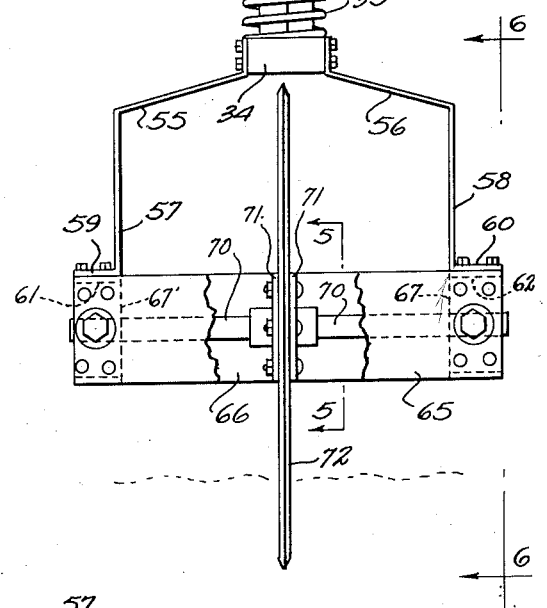
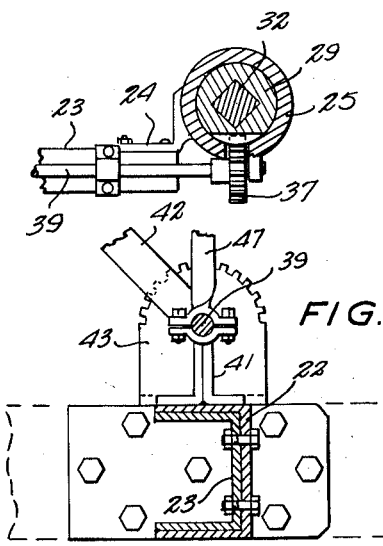
FIG. 3.
FIG. 4.
FIG. 5.
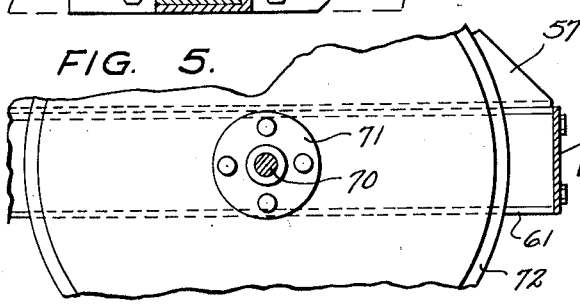
INVENTOR.
WILLIAM C. JENKINS,
BY McMorrow, Berman & Davidson
ATTORNEYS.

Feb. 7, 1950 W. C. JENKINS 2,496,727
AUTOMATIC ELECTRIC TRACTOR GUIDE
Filed Feb. 11, 1949 4 Sheets-Sheet 3
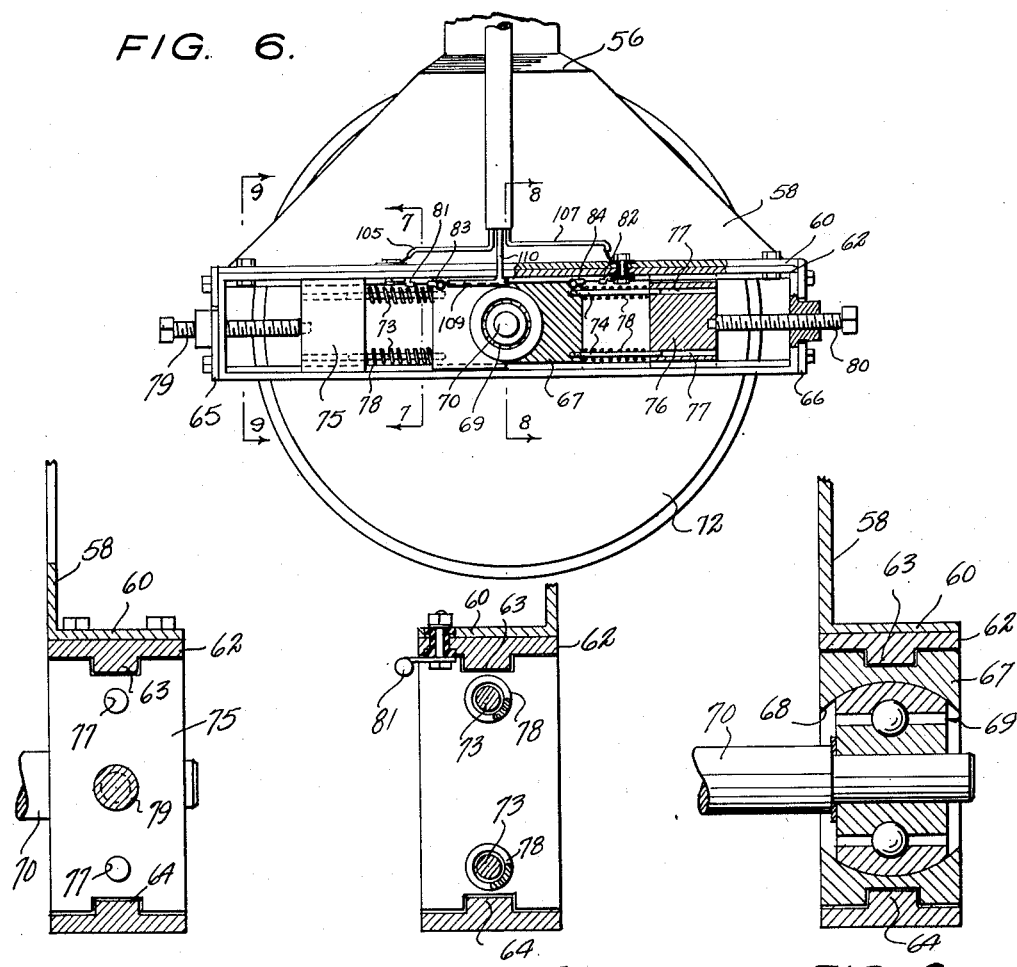
FIG. 6.
FIG. 9.   FIG. 7.   FIG. 8.
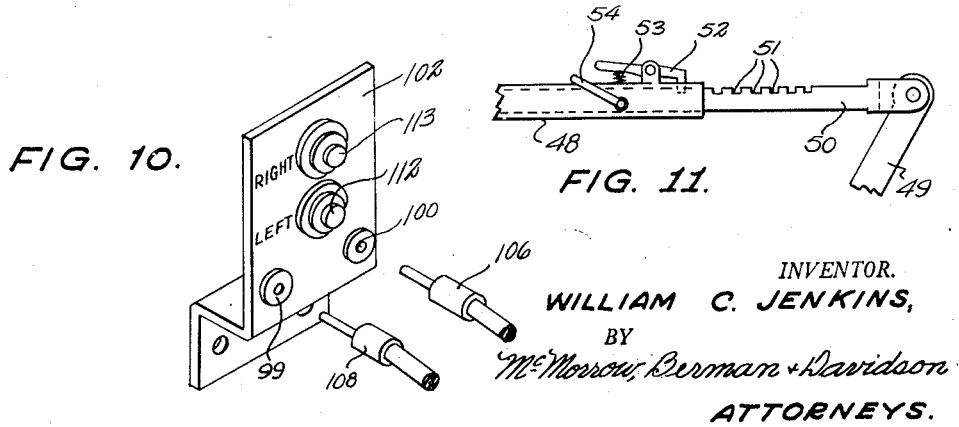
FIG. 10.   FIG. 11.
INVENTOR.
WILLIAM C. JENKINS,
BY
McMorrow, Berman + Davidson
ATTORNEYS.

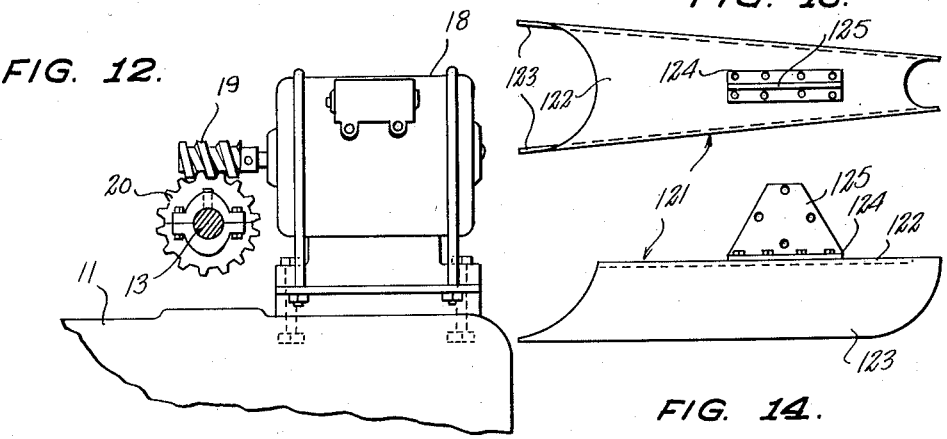
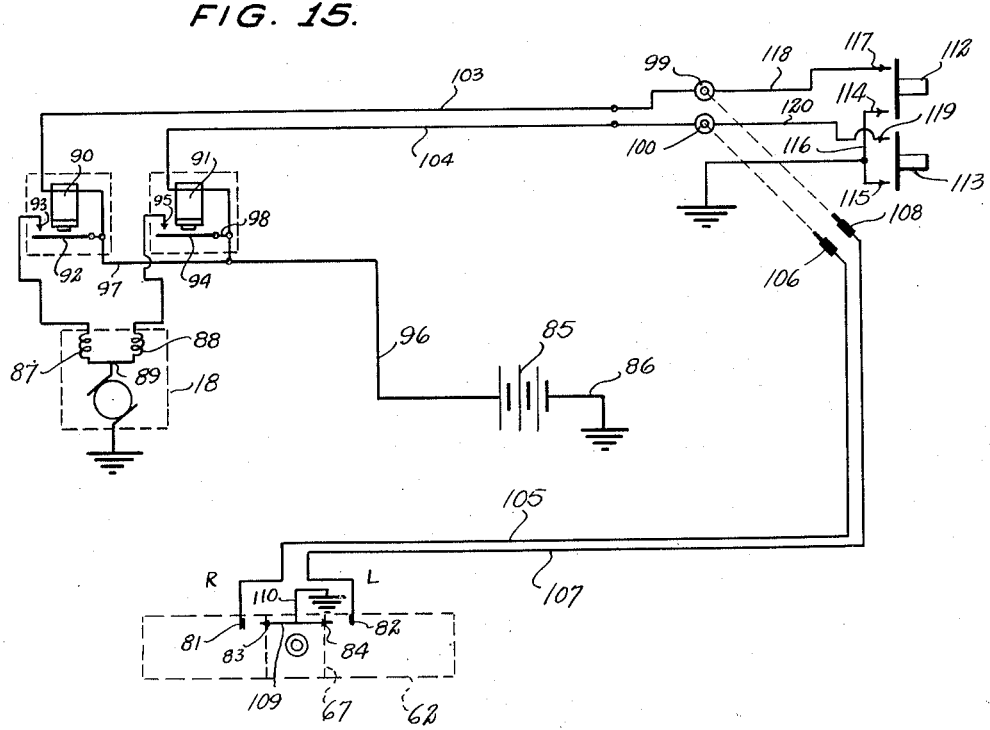

Patented Feb. 7, 1950

2,496,727

UNITED STATES PATENT OFFICE 2,496,727

AUTOMATIC ELECTRIC TRACTOR GUIDE

William C. Jenkins, Inglewood, Calif.

Application February 11, 1949, Serial No. 75,792

5 Claims. (Cl. 318—286)

This invention relates to automatic steering devices for tractors, and more particularly to an automatic tractor steering device which is electrically operated.

A main object of the invention is to provide a novel and improved guide device for a tractor, which is very simple in construction, easy to install and readily adjustable to suit various operating conditions of the tractor.

A further object of the invention is to provide an improved guide means readily attachable to a tractor and having various quickly operable adjustment means whereby the guide means may be adjusted to suit the work being performed by the tractor, the guiding element thereof travelling in the ground beside the tractor and having electrical circuit controlling elements which respond to deviations of the tractor from its intended course to correct the steering of the tractor so that it is held to said intended course.

Further objects and advantages of the invention will become apparent from the following description and claims, and from the accompanying drawings, wherein:

Figure 2 is an enlarged cross-sectional detail view taken on line 2—2 of Figure 1 and showing the ground-engaging deviation-responsive element of the guide device;

Figure 3 is a cross-sectional detail view taken on line 3—3 of Figure 2;

Figure 4 is an enlarged cross-sectional detail view taken on line 4—4 of Figure 2;

Figure 5 is a fragmentary cross-sectional detail view taken on line 5—5 of Figure 2;

Figure 6 is an elevational detail view partly in cross-section, taken on line 6—6 of Figure 2;

Figure 7 is an enlarged cross-sectional detail view taken on line 7—7 of Figure 6;

Figure 8 is an enlarged cross-sectional detail view taken on line 8—8 of Figure 6;

Figure 9 is an enlarged cross-sectional detail view taken on line 9—9 of Figure 6;

Figure 10 is an enlarged perspective detail view of the terminal panel of the guide device of Figure 1;

Figure 11 is an enlarged fragmentary elevational detail view of the adjustable connecting link member employed in the guide device of Figure 1 for operating the elevating means for the guide device from the tractor power take-off shaft;

Figure 12 is an enlarged cross-sectional detail view taken on line 12—12 of Figure 1, showing the electric motor employed for automatically steering the tractor;

Figure 13 is a top plan view of a guide shoe member which may be employed with the guide device of Figure 1 in place of the disc element shown therein;

Figure 14 is a side elevational view of the shoe member of Figure 13;

Figure 15 is a schematic wiring diagram of the electrical circuit employed in the guide device of Figure 1.

Figure 1:
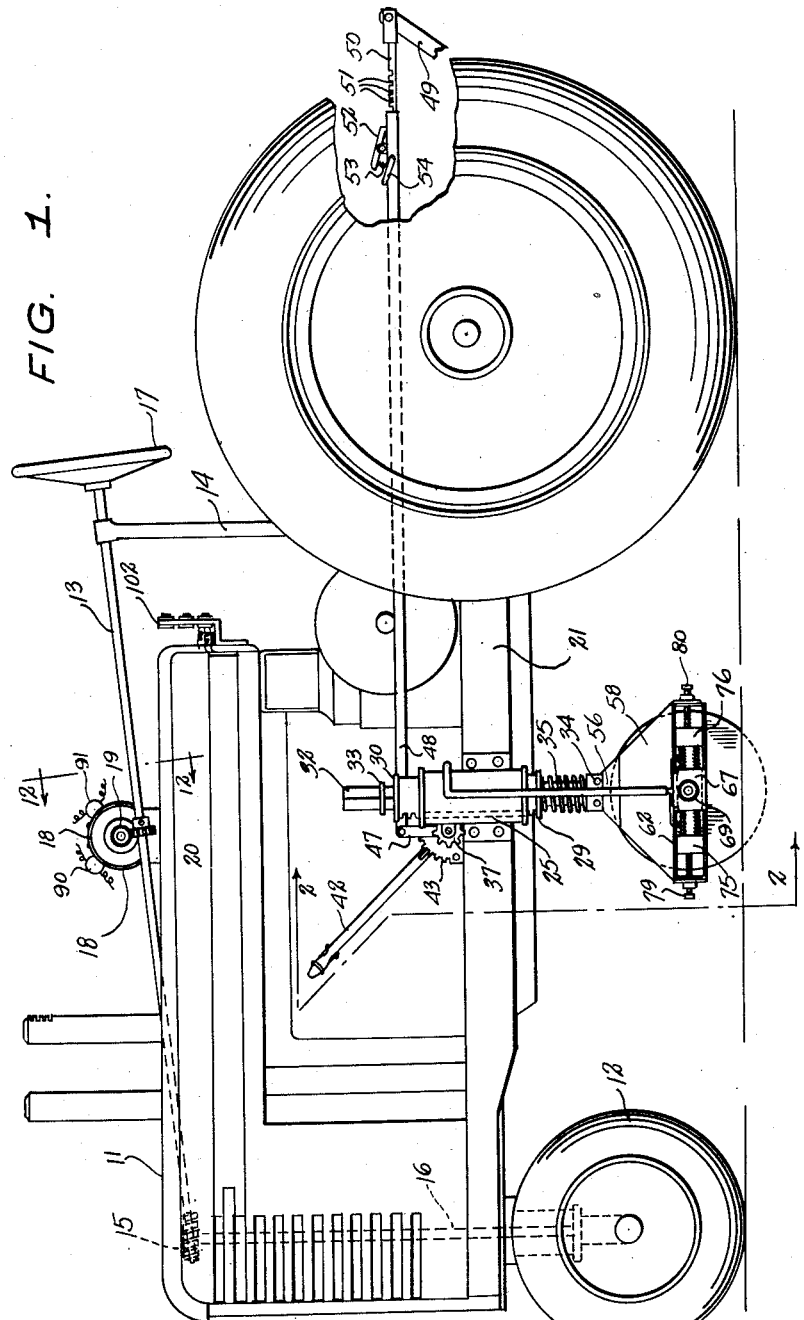
Figure 1 is a side elevational view of a tractor provided with an automatic guide device constructed in accordance with the present invention.

Referring to the drawings, 11 designates a conventional tractor having the steerable front wheels 12. The front wheels are manually steered by means of a steering post 13 rotatably supported on the tractor frame by means of brackets such as 14. Post 13 has at its forward end a worm 15 engaging a worm gear mounted on the vertical steering shaft 16, which is connected to the front wheel axle. At its rear end, post 13 is provided with a steering wheel 17.

Mounted on the tractor adjacent the intermediate portion of steering post 13 is a reversible electric motor 18. The shaft of motor 18 carries a worm 19 meshing with a worm gear 20 secured to post 13. As shown in Figure 12, worm gear 20 may comprise two segments clamped together, whereby the assembly of said worm gear on the intermediate portion of post 13 is facilitated.

Secured to one of the longitudinal side beams 21 of the tractor frame, and projecting laterally therefrom is a channel beam 22. Nested within channel beam 22 and secured thereto in an adjusted outwardly projecting position is another channel beam 23. Secured to the end of beam 23 and angularly adjustable with respect thereto is a bracket member 24 carrying a vertical sleeve member 25. As shown in Figure 2, the bracket member 24 is secured to the web of channel member 23 at one point by a rivet 26 and at two other points by bolts 27, 27 passing through arcuate slots 28, 28 formed in said web, whereby the bracket 24 may be fastened in a desired position of angular adjustment around the rivet 26. Slidably positioned in the vertical sleeve member 25 is a sleeve member 29 formed with annular end flanges 30 and 31 respectively limiting downward and upward movement of the inner sleeve member 29 with respect to the outer sleeve member 25. Inner sleeve member 29 has a squared bore in which is slidably positioned a squared shaft 32. Shaft 32 is provided adjacent its top end with a collar 33 limiting upward movement of sleeve 29 with respect to shaft 32. Secured to the lower end of shaft 32 is an enlarged head or abutment 34. Encircling the lower portion of shaft 32 and bearing between flange 31 and abutment 34 is a heavy coiled spring 35 biasing shaft 32 downwardly with respect to sleeve member 29. Said sleeve member 29 is formed with rack teeth 36, and meshing with said teeth is a gear 37 projecting through a slot 38 formed in vertical sleeve member 25. Gear 37 is carried on a shaft 39 rotatively mounted on upstanding brackets 40 and 41 secured to the respective channel members 23 and 22. Secured to the inner end of shaft 39 is a lever 42. Designated at 43 is an upstanding toothed sector plate secured to channel member 22 adjacent lever 42, through which the end of shaft 39 is rotatively received. Lever 42 is provided with a slidable locking bar 44 engageable with the teeth of sector plate 43 to lock the shaft 39 in a fixed position. Pivoted to the upper end of lever 42 is a handle 45 connected to bar 44 for releasing said bar from engagement with plate 43 when it is desired to rotate shaft 39. The upper end of lever 42 is provided with a pivoted bail 46 engageable over handle 45 to hold bar 44 in a retracted position. Rotation of shaft 39 in one direction lowers sleeve member 29 and rotation of said shaft in the opposite direction raises said sleeve member. The sleeve member may be locked in an adjusted position by engaging the locking bar 44 with the toothed sector plate 43.

Lever 42 provides a means of manually rotating shaft 39 to obtain a desired vertical adjustment of the position of sleeve member 29. When it is desired to elevate said sleeve member and squared shaft 32 to raise the parts carried by said shaft 32 to an inoperative position, the power take-off shaft of the tractor may be utilized to provide the required torque on shaft 39. For this purpose, an arm 47 is secured to shaft 39. Pivotally connected to the end of arm 47 is a rearwardly extending tubular rod 48. Connected to the power take-off shaft of the tractor, not shown, is an arm 49. Pivotally connected to the end of arm 49 is a bar 50 extending slidably into tubular rod 48. Bar 50 is formed with a plurality of spaced notches 51. Pivoted on tubular rod 48 is a dog 52 engageable through an opening in rod 48 with the bar 50 and biased into engaging relation therewith by a spring 53. Rod 48 is provided with a pivoted bail 54 engageable over dog 52 to hold said dog out of engagement with the bar 50. When bail 46 is engaged over handle 45 to hold bar 44 in retracted position and dog 52 is disengaged from bail 54, dog 52 engages one of the notches 51 in bar 50, whereby torque may be transmitted from the power take-off shaft of the tractor to shaft 39 through arm 49, bar 50, rod 48 and arm 47. However, during normal use of the automatic steering device, dog 52 is held by bail 54 in a non-engaging position with respect to bar 50 and rod 48 may slide freely with respect to said bar.

Referring now to Figures 2 and 6, it will be seen that secured to opposite sides of the abutment 34 are respective inclined plate members 55, 56 having the depending vertical portions 57 and 58. Said vertical portions terminate in horizontal flanges 59 and 60. Secured to the respective flanges 59 and 60 are the longitudinally extending elongated rectangular frames 61 and 62. The upper longitudinal element of frame 62 has a depending central rib 63 and the lower longitudinal element thereof has an upstanding central rib 64. The forward and rear ends of the longitudinal frames 61 and 62 are connected by transverse plate members 65 and 66. Slidably positioned in the intermediate portion of frame 62 is a block member 67 formed at its top and bottom with longitudinal grooves slidably receiving the respective opposing longitudinal ribs 63 64. Rigidly secured in the intermediate portion of frame 61 is another block member 67'. Each block member is formed with a spherical seat 68 in which is positioned a ball bearing assembly 69 having universal pivotal cooperation with the seat 68. Designated at 70, 70 are respective shaft elements whose outer ends are journalled in the respective ball-bearing assemblies 69. The inner ends of the shaft elements are provided with flanges, shown at 71, 71 and secured between said flanges, coaxially with the shaft elements 70, 70 is a disc member 72.

The block member 67 has secured to its forward and rear ends the respective pairs of longitudinally-extending guide pins 73, 73 and 74, 74. Slidably positioned in the frame 62 forwardly and rearwardly of the block member 67 are the abutment blocks 75 and 76 formed with longitudinal bores, such as shown at 77, slidably receiving the respective pairs of pins 73, 73 and 74, 74. Encircling the respective pins are coiled springs 78. Threaded through the forward and rear ends of the frame 62 are respective screw members 79 and 80 engaging the respective abutment blocks 75 and 76, whereby said abutment blocks may be adjusted inwardly or outwardly with respect to the block member 67. The springs 78 normally maintain the block member 67 longitudinally centered between the abutment blocks 75 and 76. Disc member 72 may be thus adjusted to extend in a longitudinal plane parallel to the desired plane of movement of the tractor, and penetrates the soil along side the tractor at a sufficient depth to hold it from turning out of said longitudinal plane. When the tractor deviates from its desired direction, the vertical side plates 57, 58, swing with the tractor, carrying with them the parallel frames 61, 62. Since the disc member 72 remains undeviated, the block member 67 moves away from its normal positions in the frame 62.

As shown in Figure 6, the top element of frame 62 is provided adjacent the front and rear ends of the block member 67 with respective electrical contacts 81 and 82, suitably insulated from the frame. Block member 67 carries contacts 83 and 84 opposite the respective contacts 81 and 82 and normally spaced therefrom. When the tractor swings in one direction from its desired course, contact 81 engages contact 83. When the tractor swings in the opposite direction from its desired course, contact 82 engages contact 84. The contacts 81, 83 and 82, 84 are employed to control the energizing circuits for the reversible steering motor 18.

Referring now to Figure 15, it will be seen that 85 designates a storage battery carried by the tractor, the negative terminal of which is connected to a ground wire 86. The motor 18 may be any conventional type of reversing motor and is shown by way of example as having the two reversely wound series fields 87, 88. One armature terminal of the motor is grounded. The other armature terminal is connected to a common connection of the series fields, shown at 89. Designated at 90 and 91 are respective solenoids.

Solenoid 90 has an armature 92 engageable with a contact 93 responsive to energization of the solenoid. Solenoid 91 has an armature 94 engageable with a contact 95 responsive to energization of solenoid 91. Designated at 96 is a wire connecting one terminal of solenoid 90 and of solenoid 91 to the positive terminal of battery 85. The armatures 92 and 94 are connected by respective wires 97 and 98 to the wire 96 connected to the positive terminal of battery 85. Contact 93 is connected to field winding 87 and contact 95 is connected to field winding 88. Designated at 99 and 100 are respective female jacks carried on a panel 102, mounted on the tractor adjacent the operator's seat. The remaining terminal of solenoid 90 is connected by a wire 103 to jack 99. The remaining terminal of solenoid 91 is connected by a wire 104 to jack 100. Contact 81 is connected by a wire 105 to a male plug 106 received in jack 100. Contact 82 is connected by a wire 107 to a male plug 108 received in jack 99. Contact 83 is connected to contact 84 by a wire 109, and wire 109 is connected by a wire 110 to ground. It will be seen that when contact 81 engages contact 83, solenoid 91 will become energized through a circuit comprising ground wire 86, battery 85, wire 96, the solenoid winding, wire 104, jack 100, plug 106, wire 105, contacts 83 and 81, wire 109, wire 110 and ground. This causes armature 94 to engage contact 95 and energizes motor 18 through series field 88 through a circuit comprising wire 86, battery 85, wire 96, wire 98, armature 94, contact 95, series field 88, the motor armature, and ground. The motor operates in a direction causing steering post 13 to turn the wheels 12 of the tractor in the proper direction to remove the reacting torque on disc 72, that is, to steer the tractor so that it travels parallel to disc 72. When this occurs, contact 81 disengages from contact 83, deenergizing solenoid 91 and deenergizing motor 18 as soon as armature 94 disengages from contact 95.

Similarly, when contact 82 engages contact 84, solenoid 90 becomes energized through a circuit comprising ground wire 86, battery 85, wire 96, the solenoid winding, wire 103, jack 99, plug 108, wire 107, contact 82, contact 84, wire 109, wire 110, and ground. This raises armature 92 and energizes motor 18 through series field 87, causing the motor to turn post 13 in the proper direction to steer the tractor back to the direction of travel of disc 72. When the tractor has been restored to this direction, the motor becomes deenergized by the opening of contacts 82, 84 and the consequent deenergization of solenoid 90.

The steering solenoids 90 and 91 may be energized manually, by the provision of push button switches 112 and 113 mounted on the panel 102. The switches 112 and 113 have respective contacts 114 and 115 which are connected together by a wire 116, said wire 116 being grounded. The remaining contact 117 of switch 112 is connected by a wire 118 to jack 99. The remaining contact 119 of switch 113 is connected by a wire 120 to jack 100. Closure of switch 112 bridges contacts 117 and 114, producing the same effect as closure of contacts 82 and 84. Closure of switch 113 bridges contacts 119 and 115, producing the same effect as closure of contacts 81, 83.

From Figure 2, it will be seen that spring 35 exerts a downward biasing force on abutment 34 which is transmitted to disc 72 through plate members 55, 56, vertical arms 57, 58, frames 61, 62, the bearing blocks 67 therein, the respective universal bearings, and the shaft elements 70, 70. The magnitude of this downward biasing force depends upon the adjusted position of the sleeve member 29. Therefore the depth of penetration of disc member 72 into the soil adjacent the tractor may be regulated by adjusting the hand lever 42.

As previously pointed out, the shaft 32 and the parts carried thereby may be elevated to inoperative positions from the power take-off shaft of the tractor by engaging dog 52 with the notched bar 50 and at the same time holding bar 44 in a retracted position by means of bail 46.

The disc 72 is employed as the deviation-sensitive member when the tractor is employed for flat farming such as sowing grain, discing, harrowing, laying off row crops, planting row crops, and for various other operations where no furrows are present. Where furrows are present and the tractor must be guided parallel to the furrows, the disc 72 is replaced by the furrow attachment shown in Figures 13 and 14. Said attachment comprises a shoe member 121 of generally channel shape having the top wall 122 and the forwardly convergent depending side walls 123, 123. Secured to top wall 122 is a bracket 124 having an upstanding longitudinal central web 125. When the attachment of Figures 13 and 14 is to be employed, the web 125 is secured between the flanges 71, 71 provided at the inner ends of the shaft elements 70, 70 the web 125 replacing the disc 72. The shoe member 121 is positioned in a furrow parallel to the intended path of movement of the tractor, the hand lever 42 being adjusted to provide a suitable amount of downward force on the shoe member to maintain it in said furrow. Deviations of the tractor will then be corrected by closure of either the contacts 81, 83 or 84, 82 caused by swinging of the frames 61, 62 with respect to the shaft elements 70, in the same manner as previously described.

The furrow attachment shown in Figures 13 and 14 may be employed in various ways. For example, it may be employed in cultivating row crops, where furrows are initially present, until the furrows are filled. It may then be removed and replaced by the disc 72 for the remainder of the cultivating operation.

The guide device eliminates the need for human guidance of the tractor while it is moving along its desired course and allows the operator to perform other duties during the movement of the tractor. This greatly reduces the number of men required to perform various operations for which the tractor is employed, since a driver is required on the tractor only at times when the tractor is to be turned from its preset course.

While specific embodiments of automatic guide apparatus for a tractor have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a tractor, a steering shaft, an electric motor coupled to said steering shaft, bracket means secured to the tractor frame, a ground-engaging member movably secured to said bracket means, said ground-engaging member being oriented in a plane parallel to the intended longitudinal plane of movement of the tractor and engaging the soil at a substantial depth so that it resists turning movement, a pair of normally open contacts, one of said contacts being carried by said bracket means and the other contact being mechanically connected to said ground-engaging member, said contacts being engageable responsive to deviation of the tractor from its intended longitudinal plane of movement, and an energizing circuit, including said contacts, connected to said electric motor.

2. In a tractor, a steering shaft, a reversible electric motor coupled to said steering shaft, bracket means secured to the tractor frame, a ground-engaging member swivelly secured to said bracket means, spring means biasing said ground-engaging member toward parallelism with the tractor, means exerting a downward force on said ground-engaging means and holding said ground-engaging means at a substantial depth below ground level so that it resists turning movement, respective energizing circuits associated with said motor for operating it in opposite directions, and a reversing switch controlled by relative angling movement of said ground-engaging means and bracket means and selectively connecting one or the other of said energizing circuits to the electric motor responsive to said angling movement.

3. In a tractor, a steering shaft, a reversible electric motor coupled to said steering shaft, bracket means secured to the tractor frame, a ground-engaging member swivelly secured to said bracket means, spring means biasing said ground-engaging member toward parallelism with the tractor, adjustable means exerting a downward force on said ground-engaging means and urging said ground-engaging means toward a substantial depth of ground engagement so that said ground-engaging means resists turning movement, a first contact element mechanically connected to said ground-engaging means, respective opposing contact elements on said bracket means on opposite sides of said first contact element and movable into contact with the first contact element responsive to deviation of the tractor from parallelism with the ground-engaging means, and respective reversing circuits connected to said motor, each circuit including said first contact element and one of the opposing contact elements.

4. In a tractor, a steering shaft, a reversible electric motor coupled to said steering shaft, laterally extending bracket means secured to the tractor frame, a vertically adjustable support carried at the end of said bracket means, said support comprising spaced longitudinal vertical frames, yoke arms secured to said frames, and a vertical shaft secured to said arms and received in said bracket means, spring means biasing the support downwardly, a shaft member slidably carried in said frames, spring means biasing said shaft member toward a position substantially transverse to the frames, a ground-engaging member secured transversely to said shaft member, a first contact element carried by said shaft member adjacent one of the longitudinal frames, respective opposing contact elements on said one frame on opposite sides of said first contact element and movable selectively into contact with said first element responsive to deviation of the tractor from parallelism with the ground-engaging member, and respective reversing circuits connected to said motor, each circuit including said first contact element and one of the opposing contact elements.

5. In a tractor, a steering shaft, a reversible electric motor coupled to said steering shaft, laterally-extending bracket means secured to the tractor frame, a vertical sleeve carried at the end of said bracket means, means for adjusting the sleeve vertically with respect to said bracket means, a non-circular vertical shaft slidably carried in said sleeve, spring means biasing the vertical shaft downwardly with respect to the sleeve, opposed yoke arms secured to the lower end of the vertical shaft, respective elongated longitudinal frames secured to the lower ends of the yoke arms, respective journal blocks slidably carried in the elongated frames, bearings pivotally mounted in said journal blocks, spring means biasing the journal blocks toward intermediate positions in said elongated frames, a transverse shaft element journalled in said bearings, a ground-engaging member secured transversely to said shaft element, a first contact element carried by one of the journal blocks adjacent a longitudinal arm of one of the elongated frames, respective opposing contact elements on said longitudinal arm on opposite sides of said first contact element and movable selectively into contact therewith responsive to deviation of the tractor from parallelism with the ground-engaging member, and respective reversing circuits connected to said motor, each circuit including said first contact element and one of the opposing contact elements.

WILLIAM C. JENKINS.

No references cited.